(12) United States Patent
Branco et al.

(10) Patent No.: US 11,119,784 B2
(45) Date of Patent: Sep. 14, 2021

(54) EFFICIENT MITIGATION OF SIDE-CHANNEL BASED ATTACKS AGAINST SPECULATIVE EXECUTION PROCESSING ARCHITECTURES

(71) Applicant: Intel Corporation, Santa Clara, CA (US)

(72) Inventors: Rodrigo Branco, Hillsboro, OR (US); Kekai Hu, Portland, OR (US); Ke Sun, Portland, OR (US); Henrique Kawakami, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 167 days.

(21) Appl. No.: 16/023,564

(22) Filed: Jun. 29, 2018

(65) Prior Publication Data

US 2019/0050230 A1    Feb. 14, 2019

(51) Int. Cl.
*G06F 9/30* (2018.01)
*G06F 9/38* (2018.01)
*G06F 21/55* (2013.01)

(52) U.S. Cl.
CPC ........ *G06F 9/3844* (2013.01); *G06F 9/30087* (2013.01); *G06F 9/30185* (2013.01); *G06F 9/3802* (2013.01); *G06F 9/3806* (2013.01); *G06F 9/3836* (2013.01); *G06F 9/3842* (2013.01); *G06F 21/55* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 10,394,716 B1 * | 8/2019 | Piry | G06F 9/30058 |
| 2016/0378657 A1 * | 12/2016 | Bradbury | G06F 9/30043 |
| | | | 711/154 |
| 2019/0130102 A1 * | 5/2019 | Johnson | G06F 12/1027 |
| 2019/0205140 A1 * | 7/2019 | Grisenthwaite | G06F 9/30018 |
| 2019/0286443 A1 * | 9/2019 | Solomatnikov | G06F 9/3842 |
| 2019/0311129 A1 * | 10/2019 | Clifton | G06F 21/52 |

(Continued)

OTHER PUBLICATIONS

Dong et al.; Spectres, Virtual Ghosts, and Hardware Support; Jun. 2, 2018; ACM.*

(Continued)

*Primary Examiner* — Corey S Faherty
(74) *Attorney, Agent, or Firm* — Alliance IP, LLC

(57) ABSTRACT

The present disclosure is directed to systems and methods for mitigating or eliminating the effectiveness of a side-channel based attack, such as one or more classes of an attack commonly known as Spectre. Novel instruction prefixes, and in certain embodiments one or more corresponding instruction prefix parameters, may be provided to enforce a serialized order of execution for particular instructions without serializing an entire instruction flow, thereby improving performance and mitigation reliability over existing solutions. In addition, improved mitigation of such attacks is provided by randomizing both the execution branch history as well as the source address of each vulnerable indirect branch, thereby eliminating the conditions required for such attacks.

12 Claims, 6 Drawing Sheets

(56) References Cited

U.S. PATENT DOCUMENTS

2019/0339977 A1* 11/2019 Wallach ............... G06F 9/3824
2019/0377581 A1* 12/2019 Sakashita ............... G06F 21/52

OTHER PUBLICATIONS

Shen et al.; Modern Processor Design: Fundamentals of Superscalar Processors, Beta Edition; 2002; McGraw-Hill Companies, Inc.*
Lipp, Moritz et. al., Meltdown, 27th {USENIX} Security Symposium ({USENIX} Security 18), 2018, 16 pages.
Kocher, Paul, et al., Spectre Attacks: Exploiting Speculative Execution, 40th IEEE Symposium on Security and Privacy (S&P'19)2018, 19 pages.
Kocher, Paul Spectre Mitigations in Microsoft's C/C++ Compiler, retrieved from https://www.paulkocher.com/doc/MicrosoftCompilerSpectreMitigation.html, Feb. 13, 2018, 9 pages.

* cited by examiner

Instruction code sequence 200

| Inst. | Instruction Code | Description |
|---|---|---|
| 201: | mov rax, [pointer] | Move value of [pointer] to register rax |
| 202: | add rax, rdi | Store sum of values from rdi and rax registers to rax register |
| 203: | cmp rax, rcx | Compare values in rax and rdi registers |
| 204: | jge abort | Abort execution if rax value > rcx value |
| 205: | mov rbx, [rax] | Load value from rax register to rbx register |

FIG. 2

Instruction code sequence 300

| Inst. | Instruction Code | Description |
|---|---|---|
| 301: | mov rax, [pointer] | Move value of [pointer] to register rax |
| 302: | add rax, rdi | Store sum of values from rdi and rax registers to rax register |
| 303: | spec_lock cmp_result cmp rax, rcx | Compare values in rax and rdi registers; create lock cmp_result for commit |
| 304: | spec_wait cmp_result jge abort | Abort execution if rax > rcx; wait for results of Instruction 303 before execution |
| 305: | spec_wait cmp_result mov rbx, [rax] | Load value from rax to rbx; wait for results of Instruction 303 before execution |

FIG. 3

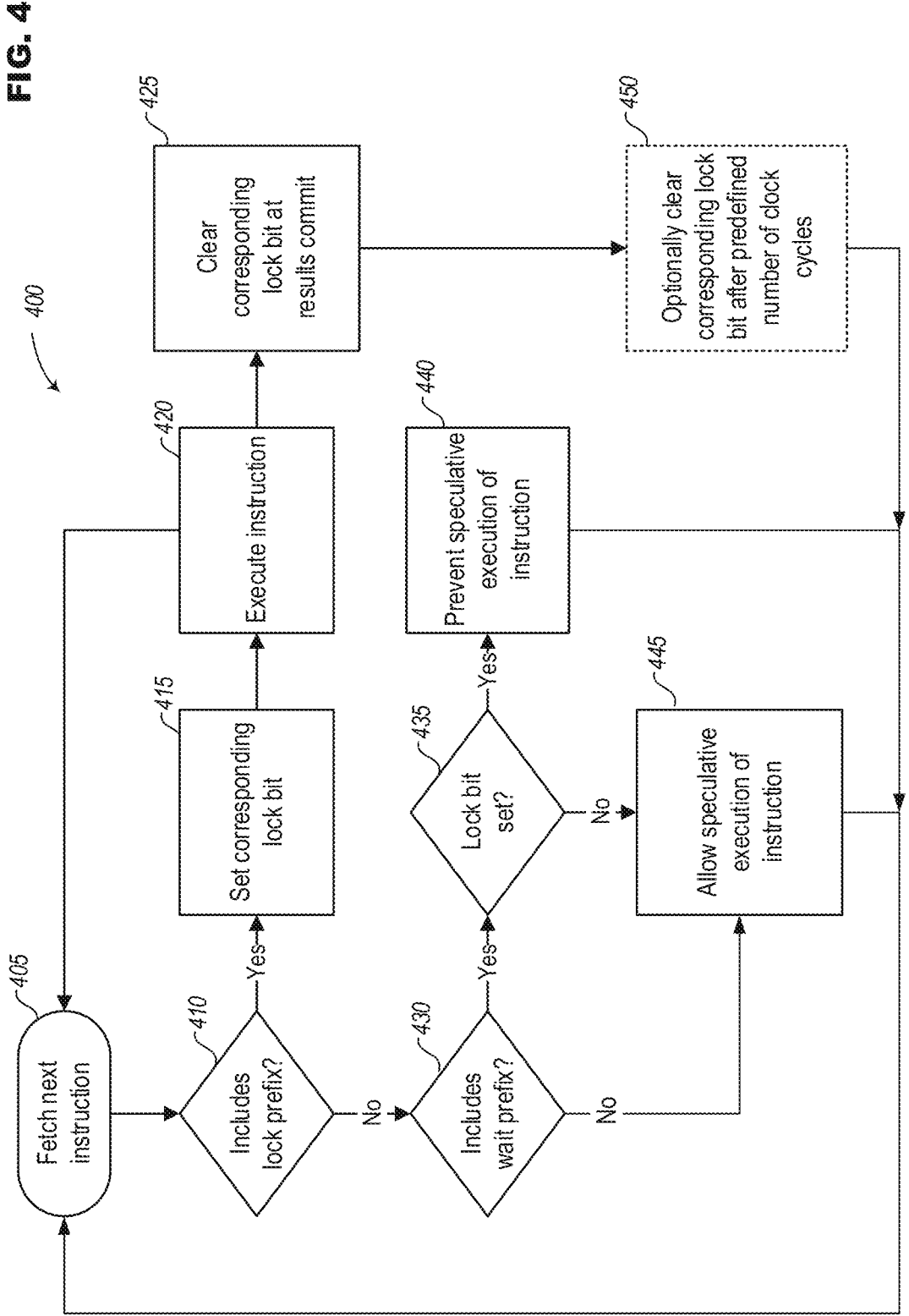

EFFICIENT MITIGATION OF SIDE-CHANNEL BASED ATTACKS AGAINST SPECULATIVE EXECUTION PROCESSING ARCHITECTURES

TECHNICAL FIELD

The present disclosure relates to computer security, and in particular the prevention or mitigation of one or more classes of side-channel based attack.

BACKGROUND

Speculative execution is utilized by most modern computing processors to achieve high performance. Such execution allows instructions to be executed prior of knowing that they will be architecturally required by the intended flow of execution. An important part of speculative execution involves branch prediction: instead of waiting for the target of a branch instruction to be resolved, the processor attempts to predict the control flow and speculatively executes the instructions on the predicted path. In many cases, the prediction is correct and boosts execution performance in terms of CPU cycles; when the prediction is wrong, results of the speculatively executed path will be discarded such that no architectural states are impacted.

Side-channel based attacks include any attack based on information gained from the implementation of a computer system, rather than weaknesses in the implemented algorithm itself. Such side-channel based attacks may use timing information, power consumption, electromagnetic leaks, or even sound as an extra source of information that is exploited to obtain information and/or data from the system. Side-channel based attacks include those typically referred to respectively as "Spectre" and "Meltdown," both of which gained widespread notoriety in early 2018 and rely on deducing whether data originates in a cached or un-cached location. To a significant degree, the determination of where data originates relies upon the precise timing of events such as loads from memory space.

A first class of Spectre attack (a "class I" attack) takes advantage of branch target misprediction by a CPU to read data from memory into cache. Upon detecting the misprediction, the CPU clears the data from the pipeline, but the data read into cache remains. A covert side-channel may then be used to obtain the residual data from the cache. In this class of attack, the attacker trains the branch predictor in a system to take a particular branch. For example, using the following instructions, an attacker may train the system by providing values for "x" that are consistently smaller than the size of "array1." The attacker thus trains the system to speculatively execute the subsequent instruction based on the assumption that the branch has been historically true:

```
if ( x < array1.size( )) {
    int value = array2[array1[x] * 256] // branch 1
}
```

After training the system, the attacker sets the cache to a known state and provides a value of "x" that exceeds the size of "array1." Having been previously trained that "x" is typically less than the size of "array1," the processor executes the branch instruction (prior to the processor throwing the exception due to "x" being greater than the size of "array1") and uses the value found at address "x" as an index to look up the value at address "x" in array2. The processor loads the value at address "x" in array2 into cache. The attacker then reads all of the values of array2 and is able to determine the value of "x" as the address in array2 having the shortest access time.

For example, assume array1 has 256 elements addressed "0" to "255." The attacker provides values of "x" between 0 and 255 to train the system that the branch instruction is routinely executed. The attacker then sets the cache to a known state and provides a value of 512 for "x" (i.e., a value greater than 255). The value "01000000" (i.e., "64") at memory location 512 is read. The processor then looks up the value of array2 at address 64*256 and loads the value into cache. The attacker then examines the read time for each element in array2, the read time for element at address 64*256 will be less than the read time for the other array2 addresses, providing the attacker the information that the address at memory location 512 is "01000000" or "64." By performing the action for every memory location, the attacker is able to read the contents of the memory byte-by-byte.

Previous approaches to thwarting or mitigating class I Spectre attacks include attempts to do so via "serializing" instructions (e.g., LFENCE for Intel processor architectures, CSDB for ARM processor architectures, etc.) prior to conditional statements or load instructions. Such approaches generally involve disabling speculative execution entirely until an identified such instruction is completed. However, such approaches result in significant expense in terms of processor clock cycles, as they completely disable speculative execution (and associated efficiencies) every time a serializing instruction is executed.

A second class of Spectre attacks ("class II" attacks) exploit indirect branching by poisoning the Branch Target Buffer (BTB) such that a CPU speculatively executes a gadget that causes the CPU to read data from memory into cache. Upon detecting the incorrect branching, the CPU clears the data from the pipeline but, once again, the data read into cache remains. A covert side-channel may then be used to obtain the residual data from the cache. In this class of attack, the attacker poisons the BTB of the victim system by repeatedly performing indirect branches to a virtual address in the victim's system that contains the gadget. For example, an attacker may control the content of two registers (R1, R2) in the victim's system at the time an indirect branch occurs. The attacker must find a gadget in the victim's system that, upon speculative execution by the victim's CPU, leaks data from selected memory locations in the victim's system. The gadget may be formed by two instructions, the first of which contains an instruction that mathematically and/or logically (add, subtract, XOR, etc.) combines the contents of register R1 with another register in the victim's system and stores the result in R2. The second instruction reads the contents of register R2, storing the value in R2 in cache.

For example, the attacker may control two registers in the victim system, ebx (register R1) and edi (register R2). The attacker then finds two instructions on the victim's system, such as:

```
adc    edi,dword ptr [ebx+edx+13BE13BDh]
adc    dl,byte ptr [edi]
```

By selecting ebx=m-0x13BE13BD-edx the attacker is able to read the victim's memory at address "m." The result is then added to the value in edi (R2). The second instruction in the gadget causes a read of R2 which contains the sum of "m" plus the attacker's value initially loaded into edi, transferring the value into the cache. By detecting the location of R2 within the cache using a side-channel timing attack, the attacker is able to determine the value of "m."

Previous approaches to thwarting or mitigating class II Spectre attacks include "return trampoline" (also known as "retpoline"), which is a compiler-supported mitigation technique. Retpoline essentially converts each vulnerable indirect branch instruction into (1) a "dummy" call that pushes a safe return address on both the process stack and the return stack buffer ("RSB"); (2) an instruction to overwrite the return address on the process stack with the indirect branch target address; and (3) a "return" instruction to the target address. However, such approaches require both a microcode update (consuming limited microcode patch resources) and operationally expensive operating system (OS) updates. Moreover, such retpoline approaches result in significant performance detriments, as they restrict speculative execution, isolate speculative resources of processing threads, and necessitate flushing of speculative arrays upon security context switches. Furthermore, because retpoline converts all indirect branches into the bifurcated "push and return" operations, it is incompatible with many existing control flow integrity mitigation techniques, such as Control-flow Enforcement Technology (CET), Control Flow Guard (CFG) and Return Flow Guard (RFG) and Reuse Attack Protector (RAP).

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 2 depicts an exemplary instruction code sequence that is vulnerable to one or more classes of side-channel based attack;

FIG. 3 depicts an exemplary instruction code sequence that has been modified to provide protection against one or more classes of side-channel based attack in accordance with at least one embodiment of techniques described herein;

FIG. 4 depicts an exemplary execution of an instruction code sequence by a processor enabled in accordance with at least one embodiment of techniques described herein;

Figure 1:
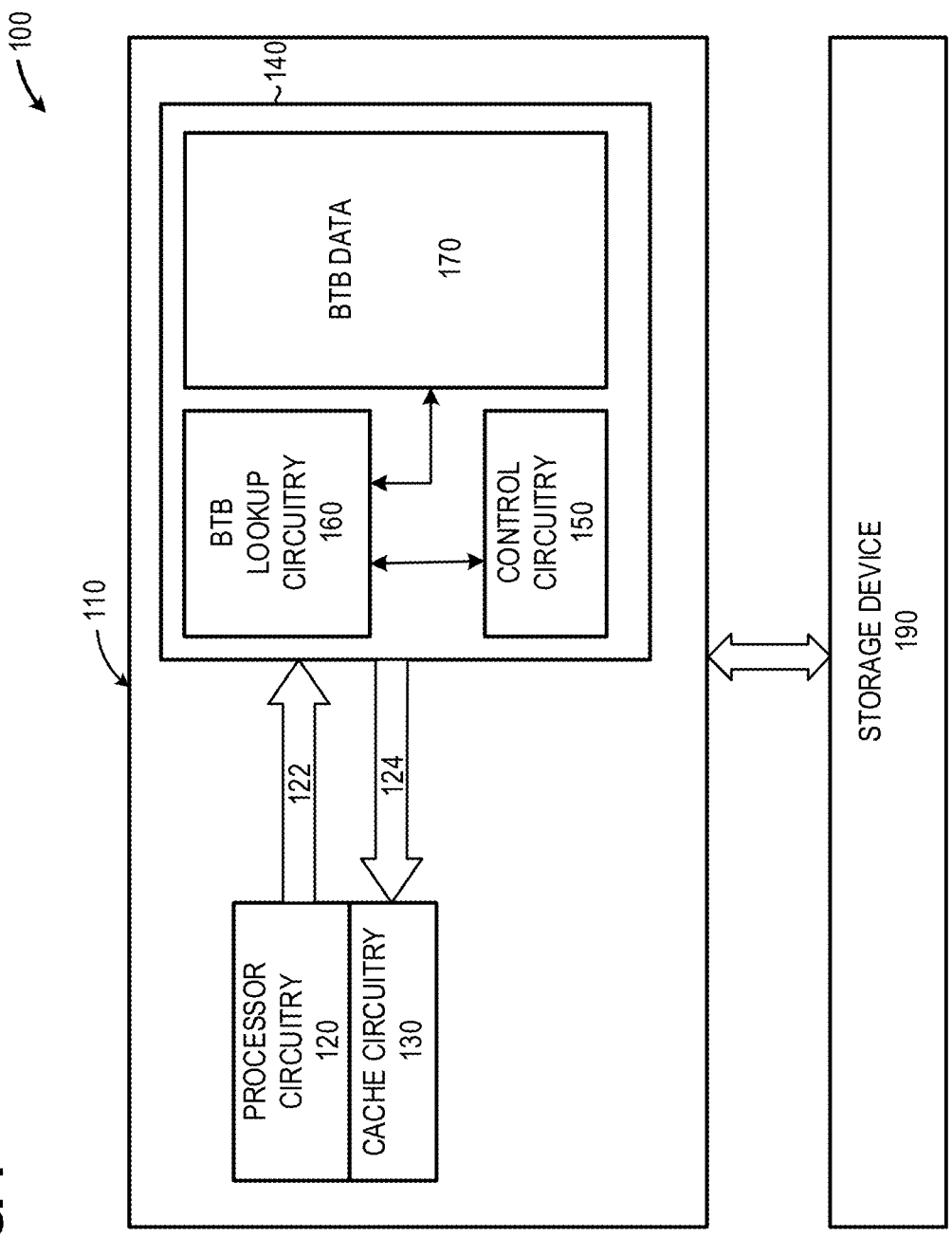
FIG. 1 depicts an exemplary integrated device that incorporates multiple disparately architected circuitry components in accordance with at least one embodiment of techniques described herein.

Although the following Detailed Description will proceed with reference being made to illustrative embodiments, many alternatives, modifications and variations thereof will be apparent to those skilled in the art.

DETAILED DESCRIPTION

In the description herein, numerous specific details are set forth, such as may include examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

The present disclosure is directed to improved techniques for preventing and/or mitigating side-channel based attacks such as the class I Spectre attacks described above. In particular, certain techniques described herein may provide improved mitigation of same-process out-of-order execution Spectre attacks (i.e., "class I" attacks) by utilizing selective serializing instructions to render such attacks moot while avoiding certain performance deficits necessitated by previous serializing approaches. In particular, techniques described herein utilize one or more novel instruction prefixes, and in certain embodiments one or more corresponding instruction prefix parameters, to enforce the order of execution for particular instructions that may leak information through speculative side channels. The instruction prefix causes some instructions to be explicitly ordered relative to one another; however, the described techniques avoid serializing the whole instruction flow, thereby improving performance and mitigation reliability over existing solutions. In addition, in certain embodiments dependencies are made explicit to the CPU core, such that security issues are mitigated with much lower performance overhead because any speculative execution is provided explicit information regarding both dependencies and hazards.

In addition, the present disclosure is directed to improved techniques for preventing and/or mitigating additional side-channel based attacks, one non-limiting example of which is a class II Spectre attack as described above. In particular, techniques described herein may provide improved mitigation of such side-channel based attacks by randomizing both the execution branch history as well as the source address (i.e., the "from address") of each vulnerable indirect branch, thereby eliminating the conditions required for such attacks. Various embodiments of these mitigation techniques may potentially be applied to any CPU architectures that make use of speculative execution, which are vulnerable to such side-channel based attacks.

As used herein, the term "processor cache" and "cache circuitry" refer to cache memory present within a processor or central processing unit (CPU) package. Such processor cache may variously be referred to, and should be considered to include, without limitation, Level 1 (L1) cache, Level 2 (L2) cache, Level 3 (L3) cache, and/or last or lowest level cache (LLC). Also as used herein, the term "instruction" is to be considered interchangeable with "directive" unless context clearly indicates otherwise.

FIG. 1 provides a high level block diagram of an illustrative system 100 that includes a central processing unit (CPU) 110 that coupled to a Branch Target Buffer ("BTB") 140 that includes BTB control circuitry 150, BTB look-up circuitry 160, and BTB data 170 in accordance with at least one embodiment described herein. In various embodiments, the BTB data 170 may include multiple distinct subsets, such as may be based on the initiator of a branch prediction inquiry 122. The BTB control circuitry 150 beneficially and advantageously causes the BTB look-up circuitry 160 to search for branch prediction data in BTB data 170, such as upon receipt of a branch prediction inquiry 122. In various embodiments, processor circuitry 120 may speculatively execute instructions, including branch instructions, to improve overall system efficiency, speed, and/or responsiveness. To determine which branch to speculatively execute, the processor circuitry 120 may communicate a branch prediction inquiry 122 to the Branch Target Buffer (BTB) 140.

If the BTB look-up circuitry 160 finds branch prediction data in the BTB data 170, the BTB look-up circuitry 160 returns the branch prediction data 124 to the control circuitry 120. If the branch prediction data 124 returned to the processor circuitry 120 is incorrect, the processor circuitry 120 may communicate a message to the BTB control circuitry 150 and the respective BTB data portion 170 may be updated to reflect the correct branch taken by the processor circuitry 120. If the branch prediction data 124 returned to the processor circuitry 120 is correct (a BTB "hit"), the BTB look-up circuitry 150 returns data indicative of the predicted path 124 to the processor circuitry 120.

As depicted in FIG. 1, the CPU 110 may include processor circuitry 120 coupled to processor cache circuitry 130. The CPU 110 may additionally include a BTB 140 having BTB control circuitry 150, BTB look-up circuitry 160; and BTB data 170. The system 100 may also include one or more storage devices 190. The one or more storage devices 190 may include machine-readable instructions that may be executed by the processor circuitry 120 and/or the BTB look-up circuitry 150.

The CPU 110 may include, but is not limited to, processor circuitry 120, cache circuitry 130, and a BTB 140 that includes BTB control circuitry 150 and BTB look-up circuitry 160. Although not depicted in FIG. 1, the CPU 110 may include other circuitry and/or structures, such as a Translation Look-Aside Buffer (TLB) circuitry, instruction cache circuitry, reorder buffers, and similar. Example CPUs 110 may include, but are not limited to, microprocessors such as Intel Pentium® microprocessor, Intel Core™ Duo processor, Intel Core i3, Intel Core i5, Intel Core i7, AMD Athlon™ processor, AMD Turion™ processor, AMD Sempron™, AMD Ryzen® processor, and ARM Cortex® processors.

The processor circuitry 120 may include any number and/or combination of electrical components, semiconductor devices, and/or logic elements capable of reading and executing machine-readable instruction sets. In embodiments, the processor circuitry 120 may include any number and/or combination of any currently available and/or future developed processors, microprocessors, controllers, and similar. In embodiments, the processor circuitry 120 may include circuitry capable of performing some or all of: generating branch prediction inquiries 122, communicating the branch prediction inquiry 122 to the BTB control circuitry 150, and receiving branch prediction data 124 from the BTB look-up circuitry 150.

The speculative execution of a branch instruction results in the processor circuitry 120 having a plurality of potential execution paths. In such instances, the processor circuitry 120 communicates a branch prediction inquiry 122 to the BTB control circuitry 150. The branch prediction inquiry 122 may include data that identifies the branch instruction. All or a portion of the branch instruction identifier may be used by the BTB control circuitry 150 to identify the initiator of the branch prediction inquiry 122. All or a portion of the branch instruction identifier may be used by the BTB look-up circuitry 160 to determine whether branch prediction data exists within BTB data 170.

Generally, BTB data 170 includes predicted branch information based upon successful prior branch selections. In other words, if the processor circuitry 120 has selected branch "A" rather than branch "B" in response to instruction "C," the BTB look-up circuitry 140 will return a branch prediction of "A" to the processor circuitry 120. In response, the processor circuitry 120 will then speculatively execute the instructions included in branch "A" rather than the instructions included in branch "B." Some classes of side-channel based attacks "poison" the data included in the a BTB data portion 170 by repeatedly executing a branch instructions that cause changes in the data stored in the BTB data portion 170 such that the attacker is now able to insert malicious code (sometimes referred to as a "gadget") on the predicted branch and cause the processor circuitry to speculatively execute a branch instruction pointing to the code. By causing repeated errors in branch prediction through poisoning or corrupting the data included in BTB data 170, an attacker is able to read protected or secret memory locations at the system level on the user's system. By causing repeated errors in branch prediction through poisoning or corrupting the data included in BTB data 170 on a client/server system, an attacker may be able to read protected or secret memory locations at the system level and at the at the user level of other clients.

The cache circuitry 130 may include any number and/or combination of electrical components, semiconductor devices, and/or logic elements capable of non-persistently storing digital information and/or data. In embodiments, all or a portion of the cache circuitry 130 may be communicably coupled to a single processor circuit 120. In other embodiments, all or a portion of the cache circuitry 130 may be shared between multiple subsets of processing circuitry 120. In embodiments, the cache circuitry 130 may store information and/or data as a cache line, for example, as a 64-byte cache line.

The BTB 140 includes BTB control circuitry 150 and BTB look-up circuitry 160 that is coupled to BTB data 170, which may include data representative of branch predictions for one or more particular users, systems, clients, or servers. In embodiments, the BTB control circuitry 150 may dynamically apportion the BTB 140 across or among one or more segregated portions of BTB data 170.

The BTB control circuitry 150 may include any number and/or combination of currently available and/or future developed electrical components, semiconductor devices, and/or logic elements capable of executing machine-readable instruction sets that cause the BTB control circuitry to: receive data associated with the branch prediction inquiry 122 from the processor circuitry 120; determine the initiator of the branch prediction inquiry 122; and provide instructions to the BTB look-up circuitry 160 to search BTB data 170.

The BTB look-up circuitry 160 may include any number and/or combination of currently available and/or future developed electrical components, semiconductor devices, and/or logic elements capable of receiving data associated with the branch prediction inquiry instruction 122 from the processor circuitry 120; determining whether branch prediction data exists; and returning data associated with the branch prediction 124 to the processor circuitry 120.

Although depicted in FIG. 1 as disposed in the CPU 110, in embodiments, the BTB 140 may be disposed external to and coupled to the CPU 110. In embodiments, the BTB 140 may be included as a portion of memory management circuitry that is at least partially disposed in or coupled to the processor circuitry 120. In embodiments, all or a portion of the BTB 140 may be communicably coupled to a single processor circuit 120. In other embodiments, all or a portion of the BTB 140 may be shared between multiple portions of processor circuitry 120.

The storage device 190 may include any number and/or combination of currently available and/or future developed electrical components, semiconductor devices, and/or logic elements capable of storing machine-readable instructions that cause the BTB look-up circuitry 150 to determine whether a branch prediction inquiry originated at the system-level or at the user-level. Responsive to determining the branch prediction inquiry represents a system-level branch prediction inquiry, the storage device 190 may include instructions that cause the BTB look-up circuitry 150 to query all or a portion of BTB data 170 to determine if a branch prediction exists within the BTB 140.

FIGS. 2-4 are provided to depict operations and context related to improved techniques for preventing and/or mitigating certain side-channel based attacks, such as (but not limited to) the class I Spectre attacks described elsewhere herein. In particular, such techniques may provide improved mitigation of same-process out-of-order execution attacks (i.e., "class I" attacks) by utilizing selective serializing instructions to render such attacks moot while avoiding certain performance deficits necessitated by previous serializing approaches.

FIG. 2 depicts an exemplary instruction code sequence 200, which will be understood as a typical boundary checking code sequence that checks to determine whether a location is within a valid address range. This exemplary instruction code sequence 200 is vulnerable to a class I Spectre attack.

In normal execution flow, without speculative and/or out-of-order execution, the exemplary instruction code sequence 200 results in the following operations. Instruction 201 moves the contents of a memory location pointed by pointer to register rax. Instruction 202 adds a value from register rdi to the values stored in register rax and stores the result to register rax. Instruction 203 compares a value stored in register rax with a value stored in register rcx. If, as a result of such comparison, the value from register rax is determined to be greater or equal to the value from register rcx, instruction 204 jumps to an abort function—thus preventing execution of Instruction 205. Otherwise, Instruction 205 loads the value stored in the location of rax to rbx. Thus, Instruction 205 is a conditional load instruction that should be executed only after a successful boundary check in Instruction 204. It will be appreciated that this exemplary instruction sequence 200 comprises typical boundary checking code that checks to determine whether the location rax is within a valid address range: the value stored at address rax will be read to rbx only if rax is smaller than rcx; otherwise, the abort will occur and the value stored at address rax will not be read.

The exemplary instruction code sequence 200 works perfectly if all of Instructions 1-5 are executed in a serialized order. However, as noted elsewhere herein, modern processors implement speculative branch predictions and out-of-order executions in order to increase efficiency and performance. In a speculative and out-of-order execution scenario, cache-based side-channel based attacks such as Spectre will break this boundary check.

In a speculative execution scenario, because Instructions 201-203 involve an indirect read, a math computation and a comparison, final comparison results for Instruction 203 are typically achieved relatively slowly. In order to improve the performance, rather than waiting for such final comparison results of the calculation, the processor may assume that the bounds check is passed and therefore speculatively execute Instruction 205 by reading the value at location rax to rbx. By the time the bounds check is completed (i.e., "commits"), the value in rbx is ready if the bounds check is passed; if the bounds check fails, the value in rbx will be discarded and will not be accessible.

As discussed elsewhere herein, cache-based side-channel based attacks such as Spectre take advantage of the fact that the access time for retrieving data in a cache is much faster than the corresponding access time for retrieving such data when that data is not in cache. Although the speculative read of instruction 5 will not commit if the read is out of bounds, the fact that it is executed before the bounds check can be used to generate a measurable timing side effect that an attacker may leverage in order to leak the content stored at address rax. Therefore, as long as the out-of-order execution of Instruction 204 and Instruction 205 exists, the timing side channel (and corresponding vulnerability to a timing side-channel based attack) exists.

Prior solutions for mitigating such vulnerabilities to side-channel based attacks include serialization, such as by adding "fence" instructions (e.g., LFENCE, MFENCE, etc.) between Instruction 204 and Instruction 205; in this manner, all speculative operations from Instruction 205 forward are suspended until Instruction 204 commits—consequently, there will be no out-of-order execution between Instruction 204 and Instruction 205. However, as noted above, although such serialization mitigation prevents certain cache- and timing-based side-channel based attacks, it may also result in high performance overhead by disabling all speculative execution when applied.

In contrast, techniques presented herein with respect to certain embodiments include a lock-based instruction ordering mechanism for speculative out-of-order executions to keep track of the serialization relationships between one or more instructions. In exemplary such embodiments, two new instruction prefixes (herein termed "spec_lock" and "spec_wait," although it will be appreciated that any nomenclature may be used) and a lock table are introduced. In certain embodiments, one or more of such prefixes may also include a prefix parameter to encode or otherwise associate a specified tag with a particular lock, allowing multiple locks to coexist (such as may be used in a nested loop, within different functions, or in other scenarios). For example, if an 8-bit prefix parameter is used, a corresponding lock table may include a 256-bit array to represent up to 256 possible locks. In various embodiments, such instruction prefixes may be utilized by a compiler enabled by the techniques described herein, such as to identify conditional branch instructions deemed vulnerable to side-channel or other attacks described elsewhere herein (e.g., Spectre attacks).

In at least some embodiments, the described instruction prefixes may be inserted during compile time by a compiler or JIT compiling engine. Some programming languages, such as those that may rely on JIT compilation such as Java and JavaScript, already include facilities for automatic code generation (such as for bounds-check), and thus may be readily adapted to utilize such instruction prefixes. Other languages that may not include primitives for bounds-check (such as the C programming language) may depend on one or more compiler rules to identify and apply such prefixes. Such rules already exist for the current solution for this type of the Spectre attack (e.g., an LFENCE or other such instruction). Various compilers may also support programming and markup extensions to allow developers to manually support the use of such prefixes.

In various embodiments, execution of instruction code sequences that include the described instruction prefixes may be summarized as follows: when an instruction with a lock prefix is fetched, a corresponding lock bit is set; when an instruction with a corresponding wait prefix is fetched, it will only enter out-of-order execution if the corresponding lock bit is not set; when an instruction with a lock prefix completes execution, the corresponding lock bit is reset. Operations exemplifying this summarized behavior are described in greater detail below with respect to FIGS. 3 and 4.

FIG. 3 depicts a modified exemplary instruction code sequence 300, which comprises a boundary checking code sequence similar to that described above with respect to exemplary instruction code sequence 200 of FIG. 2. In the depicted embodiment, the exemplary instruction code sequence 300 utilizes an instruction lock in accordance with techniques described herein to prevent speculative execution of particular instructions associated with that instruction lock.

The exemplary instruction code sequence 300 results in the following operations. Instruction 301 moves the content of a memory location indicated by pointer to register rax. Instruction 302 adds a value from register rdi to the values stored in register rax and stores the result to register rax. Instruction 303 compares a value stored in register rax with a value stored in register rcx, such that if (as a result of such comparison) the value from register rax is determined to be greater or equal to the value from register rcx, instruction 304 jumps to an abort function and thereby prevents execution of Instruction 305.

In notable contrast with the similar Instruction 203 of instruction code sequence 200 and FIG. 2, Instruction 303 further includes an instruction prefix spec_lock, creating a speculative execution lock associated with the result of the instruction. Moreover, although in certain embodiments and scenarios a speculative execution lock may be utilized without any additional parameters, in the depicted embodiment the speculative execution lock created by Instruction 303 further includes a lock identifier parameter cmp_result. Instruction 304 comprises the identical "jge abort" directive of Instruction 204 of FIG. 2, but in notable contrast further includes the instruction prefix spec_wait and the lock identifier parameter cmp_result, indicating that no speculative execution of Instruction 304 is to be performed until the speculative execution lock associated with lock identifier parameter cmp_result has been cleared—i.e., until the compiler has committed the result of Instruction 303. Similarly, Instruction 305 comprises the "mov rbx, [rax]" directive of Instruction 205 from FIG. 2, but further includes the instruction prefix spec_wait and lock identifier parameter cmp_result, again indicating that no speculative execution of Instruction 305 is to be performed until the speculative execution lock associated with lock identifier parameter cmp_result has been cleared.

It will be appreciated that in accordance with the described usage of such speculative execution locks, the speculative execution of specified instructions is prevented but that normal speculative execution and out-of-order processing—and the corresponding efficiencies and other processing advantages associated with such modern processor features—are otherwise enabled.

FIG. 4 depicts an exemplary execution flowchart 400, in which a processor enabled via techniques presented herein is presented with an instruction code sequence for execution. The depicted operations begin at block 405, in which the processor fetches a next instruction for execution. It will be appreciated that such next instruction may or may not be an initial directive within the exemplary instruction code sequence.

At block 410, the processor determines whether the fetched instruction includes a speculative execution lock prefix, such as the "spec_lock" prefix described above with respect to exemplary instruction code sequence 300 FIG. 3. As noted elsewhere herein, of course, any nomenclature may be used to represent such a speculative execution lock. If it is determined that the fetched instruction includes a lock prefix, the processor proceeds in block 415 to set the lock bit corresponding to the lock identifier parameter associated with the specified speculative execution lock. As noted elsewhere herein, in certain embodiments no such lock identifier parameter may be associated with the speculative execution lock (such as if only a single such speculative execution lock is utilized by the compiler and/or processing core). For the depicted embodiment of FIG. 4, we will assume that multiple speculative execution locks—and multiple corresponding lock identifier parameters—may be utilized. At block 420, the processor executes the instruction that included the speculative execution lock prefix; at block 425, the processor clears the corresponding lock bit once the results of the instruction have committed. It will be appreciated that while block 425 is depicted as immediately following block 420, significant operations may be performed between the fetched instruction being executed and the results of that instruction are committed, such as the processor again proceeding to block 405 to fetch one or more additional instructions for processing (either serialized or speculative).

If in block 410 it was determined that a fetched instruction does not include a speculative execution lock prefix, at block 430 the compiler determines whether the fetched instruction includes a wait prefix associated with such a speculative execution lock, such as the "spec_wait cmp_result" prefix and lock identifier parameter discussed above with respect to Instructions 304 and 305 of exemplary instruction code sequence 300 within FIG. 3. If so, then at block 435 the compiler determines whether the lock bit corresponding to the associated lock identifier parameter is set. If so, then at block 440 the compiler prevents the speculative execution of the instruction, and returns to block 405 to fetch the next instruction for processing accordingly.

If in block 430 it was determined that the fetched instruction does not include a wait prefix associated with a speculative execution lock, or if in block 435 is determined that the corresponding lock bit for the identified speculative execution lock is not set, then the processor proceeds to block 445, such as to allow and/or carry out speculative execution of the instruction as usual.

In certain embodiments, lock bits corresponding to one or more speculative execution locks may be cleared after a predefined number of clock cycles, such as a predefined number associated with a maximum possible instruction latency of the processing core. In this manner, for example, processing deadlocks may be avoided. In the embodiment of FIG. 4, this type of optional clearing of the lock bits is depicted at block 450.

Figure 5A:
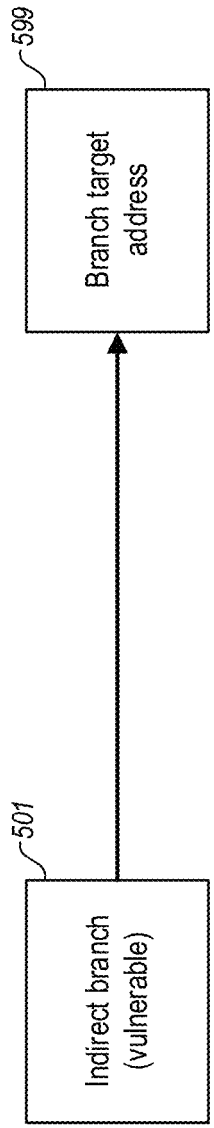
FIG. 5A depicts an exemplary program execution flow of a vulnerable indirect branch instruction that is vulnerable to one or more classes of side-channel based attacks as described herein and elsewhere.
Figure 5B:
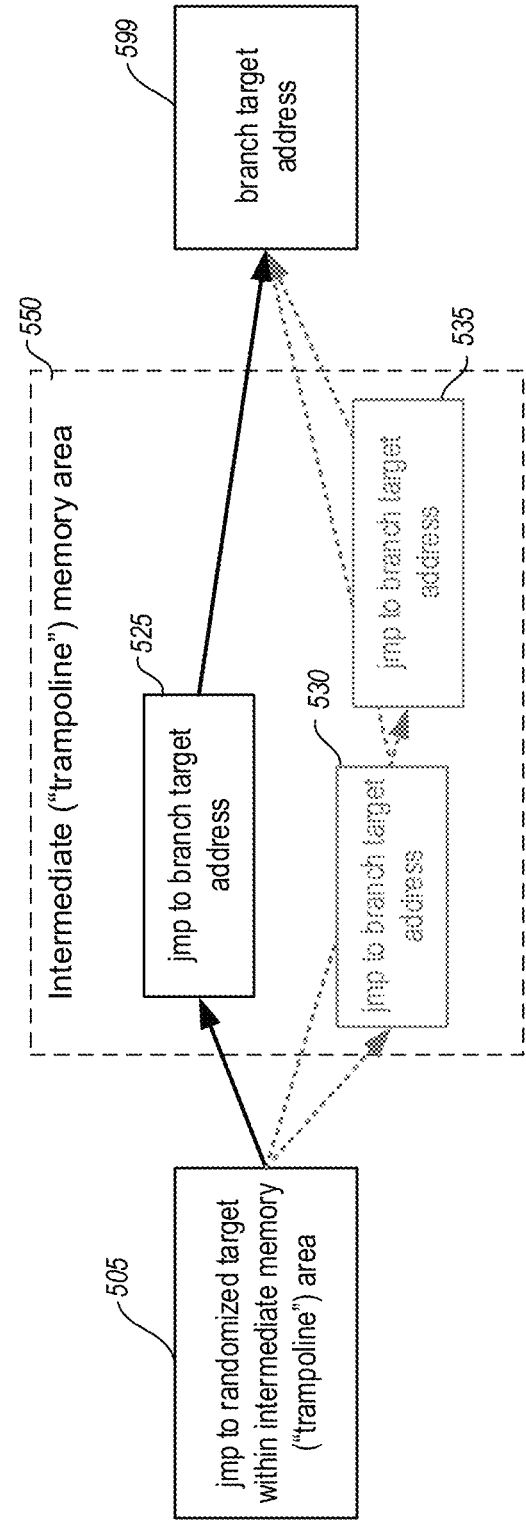
FIG. 5B depicts a portion of an exemplary protected program execution flow that mitigates or eliminates the vulnerabilities of indirect branch instructions in accordance with one or more embodiments of techniques described herein.
Figure 6:
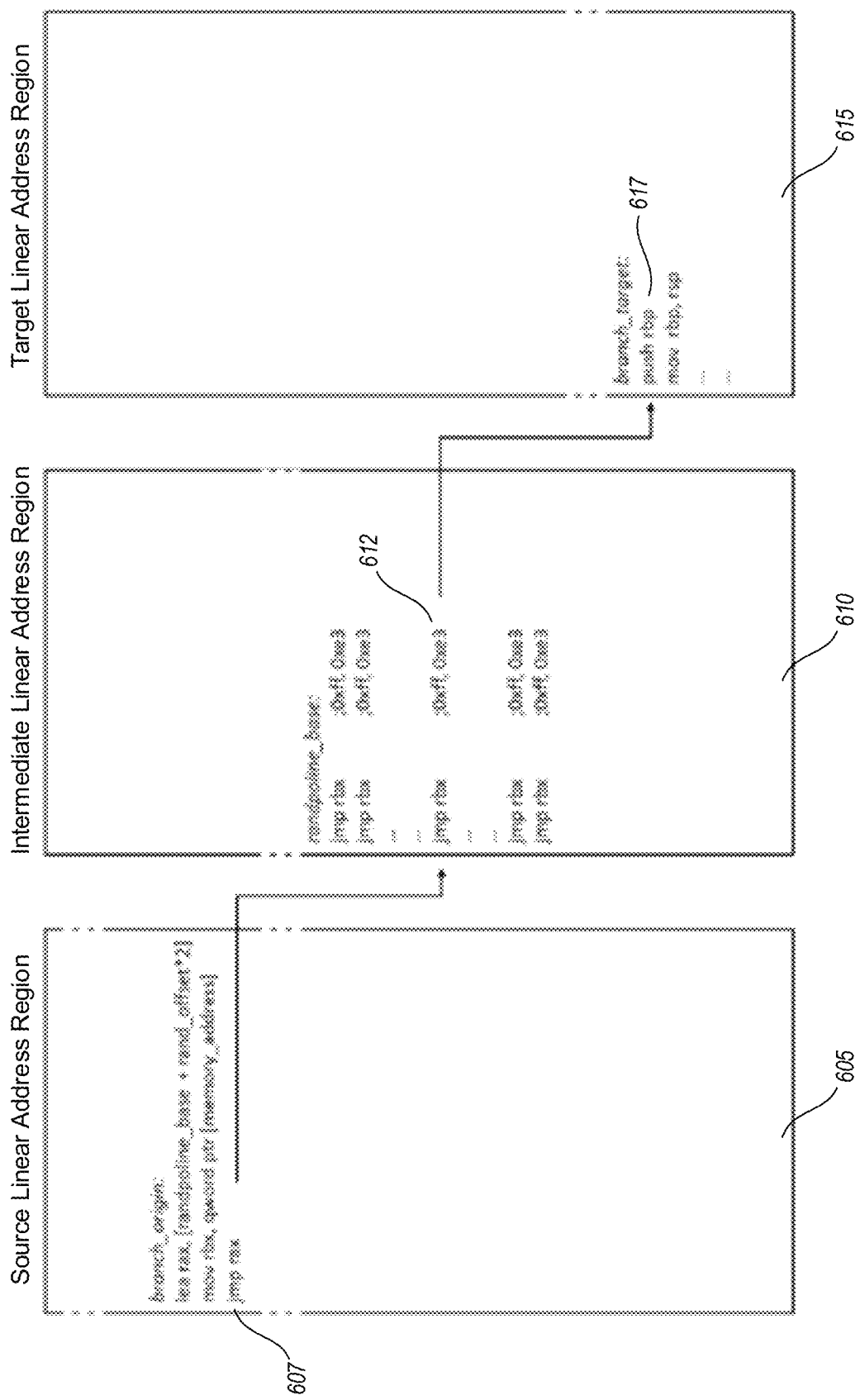
FIG. 6 depicts a portion of an exemplary protected program execution flow that mitigates or eliminates the vulnerabilities of indirect branch instructions in accordance with one or more embodiments of techniques described herein.

FIGS. 5A-5B and 6 are provided to depict operations and context related to improved techniques for preventing and/or mitigating certain side-channel based attacks such as (but not limited to) the class II Spectre attacks described above. In particular, such techniques may provide improved mitigation of such side-channel based attacks by randomizing both the execution branch history as well as the source address (i.e., the "from address") of each vulnerable indirect branch, thereby eliminating the conditions required for such attacks. Processing architectures that make use of speculative execution are vulnerable to such side-channel based attacks due in large part to the following characteristics: (1) speculative execution is not necessarily bounded by architectural security checks; (2) cache lines filled by speculative execution is not reversed (e.g., "flushed") when the speculatively executed code is dropped, thus leaving measurable trace to architectural execution; and (3) branch prediction resources (such as source and target addresses) are shared by entities with different security context (e.g., different processes on the same core, user mode code and kernel mode code, different threads of the same physical core).

As described elsewhere herein in greater detail, certain side-channel based attacks take advantage of indirect branch predictors inside the processor via branch target injection, such that a malicious attacker influences the branch prediction—and thus the speculative execution of the victim process—by injecting a speculative branch target into the indirect branch predictor. The speculatively executed code in the victim process can do secret-dependent cache loading that eventually leaks the secret value. In particular, an attacker needs to run "training code" which satisfies the following conditions: (1) it must contain an indirect branch with an identical linear address (or aliased linear address) as the vulnerable indirect branch inside the victim process; and (2) the branch history immediately prior to the vulnerable indirect branch within the victim process must match that of the attacker's training code.

In various embodiments, such side-channel based attacks are prevented or mitigated by breaking the necessary conditions of the attack by randomizing, for each vulnerable indirect branch, one or both of the branch history and the source address. Via such randomization, the possibility of successful such side-channel based attacks may be reduced to a level that is impractical to exploit, thereby effectively mitigating the vulnerability. In various embodiments, such randomization may be achieved by introducing an intermediate area in memory that includes continuous indirect branch instructions, (e.g., "jmp rax"), which serves as a "randomized trampoline" (or "randpoline") between the original source address and target address of a vulnerable indirect branch. In at least some embodiments, each process to be protected may be provided with a per-process intermediate memory area comprising a plurality of indirect branch instructions, an example of which is shown below:

| //intermediate memory area: | | | |
|---|---|---|---|
| 0: | ff e3 | jmp | rbx |
| 2: | ff e3 | jmp | rbx |
| 4: | ff e3 | jmp | rbx |
| 6: | ff e3 | jmp | rbx |
| 8: | ff e3 | jmp | rbx |
| a: | ff e3 | jmp | rbx |
| ... | | | |
| n: | ff e3 | jmp | rbx |

Thus, in order to achieve the desired randomization described above, in certain embodiments a vulnerable indirect branch may be converted into (1) a low-latency jump from the original source address of the indirect branch to the intermediate memory area, with the low-latency jump including a random offset; and (2) an indirect jump from the intermediate memory area to the originally specified target address. In this manner, both the source address of the vulnerable indirect jump and the branch history immediately prior to that vulnerable indirect jump are randomized. In certain embodiments, the random offset (which determines the particular intermediate target address within the intermediate memory area) may comprise a random number generated at runtime. It will be appreciated that without direct knowledge of such random offset, an attacker may be prevented from injecting a speculative indirect branch entry that matches the execution flow of a victim process without utilizing an impractical brute force approach.

FIG. 5A depicts an unmitigated execution flow of a vulnerable indirect branch instruction. In particular, a vulnerable indirect branch instruction 501 branches to a target address 599 without intermediate steps. Notably, the execution flow 500 is vulnerable to side-channel based attacks in the manner described above, such as with respect to class II Spectre attacks.

FIG. 5B depicts an exemplary protected execution flow that mitigates or eliminates the vulnerabilities of such indirect branch instructions in accordance with techniques described herein. In particular, in contrast to the vulnerable indirect branch instruction 501 of FIG. 5A, indirect branch instruction 505 has been converted to a branch instruction directed to a randomized target address within an intermediate memory area 550. The intermediate memory area 550 includes a plurality of indirect branch instructions that includes intermediate jump instruction 525, intermediate jump instruction 530, and intermediate jump instruction 535. The particular intermediate jump instruction within the intermediate memory area 550 to which the indirect branch instruction 505 is directed is determined by a randomized offset (not shown). In this manner, an attacker is rendered unable to provide training code that anticipates the destination address of that intermediate target. For example, depending on the random offset generated at runtime, the indirect branch instruction 505 may be directed to any one of the intermediate jump instruction 525, intermediate jump instruction 530, and intermediate jump instruction 535. In this manner, the first requirement condition for a class II side-channel based attack (that the attacking "training code" must contain an indirect branch with an identical linear or aliased address as the vulnerable indirect branch of the victim process) is broken. It will be appreciated that in various embodiments, of course, the intermediate "trampoline" memory area 550 may include many more than merely the three intermediate jump instructions of the illustrated embodiment, which is simplified for clarity.

Each of the intermediate jump instructions 525, 530 and 535 direct execution flow to the branch target address 599.

However, because the branch history immediately prior to that branch target address 599 has been randomized as described above, the second requirement condition for a class II side-channel based attack (that the branch history immediately prior to the vulnerable indirect branch within the victim process must match that of the attacker's training code) is also broken. In this manner, such side-channel based attacks are likely prevented entirely or mitigated to an extent that renders such attacks impracticable.

FIG. 6 depicts three distinct linear memory address regions that include a source linear address region 605, an intermediate linear address region 610, and a target linear address region 615. It will be appreciated that the linear address regions depicted in the illustrated embodiment need not be associated with one another in any way, and may be established completely independently from one another.

The source linear address region 605 includes an instruction code segment that has been modified in accordance with techniques described herein, such as to mitigate vulnerability to one or more classes of side-channel based attacks. In particular, in the depicted embodiment a vulnerable indirect jump such as
   jmp qword ptr [memory_address]
has been converted to

```
lea rax, [randpoline_base + rand_offset*2]
mov rbx, dword ptr [memory_address]
jmp rax
``` where randpoline_base is a constant known at compiling time or loading time and may in at least the depicted embodiment be used as an immediate, and wherein rand_offset is based on a random number generated at runtime. In various embodiments, the random number may be either a pseudorandom number or a cryptographic random number, and depending upon mitigation requirements may be generated (as non-exclusive examples) per process, per routine, or per branch. In certain embodiments, rand_offset may be stored in register region to avoid memory access.

As noted elsewhere herein, the reserved intermediate linear address region 610 comprises a plurality of identical jump instructions, each with a corresponding target address that is identical to the original vulnerable indirect jump. In the depicted embodiment, the destination address of the first "jmp rax" instruction 607 is determined by the addition of the random offset rand_offset*2 to the base address randpoline_base, with the 2× multiplier corresponding to the two-byte size of each instruction within intermediate linear address region 610. Upon completion of that "jmp rax" instruction 607, execution jumps to intermediate jump instruction 612 within the intermediate linear address region 610, which in turn directs execution to the original target destination instruction 617.

In various embodiments, the randomization entropy associated with a specified intermediate memory area may be related to the size of the intermediate memory area. For example a two megabyte (2M) intermediate memory area per process can provide 20 bits of entropy. Moreover, although the embodiment depicted in FIG. 6 illustrates only a single intermediate memory area, in other embodiments multiple intermediate memory areas may be utilized in order to increase randomization entropy and further mitigate the likelihood of a successful side-channel based attack. A multiple-level intermediate memory area may increase such entropy exponentially with only a very limited increase in memory footprint. As one non-limiting example assuming a dual level intermediate memory area (in which each vulnerable indirect branch is modified to include a first randomized jump to a first intermediate memory area, followed by a second randomized jump to a second intermediate memory area, and then a jump to the final branch target address) may achieve 40 bit randomness entropy utilizing only a 4M intermediate memory area per process.

It will be appreciated that even with relatively low entropy (e.g., 16 bit randomness entropy), such randomization renders side-channel based attacks largely impracticable, at least because there is always noise in cache-loading measurements due to speculative touches from arbitrary code execution. Besides the fact that an attacker process would potentially be required to brute force each targeted byte of information (with an enormous corresponding time cost), it is almost impossible to discern such a brute-forced signal from background noise.

In various embodiments, the "randpoline" techniques described herein may also be applied to vulnerable indirect calls. For example, the vulnerable indirect call
   call qword ptr [memory_address]
may be converted to the following code under randpoline:

```
branch_origin:
jmp call_label
jmp_LabeL:
lea rax, [randpoline_base + rand_offset*2]
mov rbx, qword ptr [memory_address]
jmp rax
caLL_LabeL:
call jmp_label
return_LabeL:
```

While such techniques provide protection against certain classes of side-channel based attacks, the modified code segment above remains consistent with the original control flow, such that the invoking routine will return to return_label.

Unlike the "retpoline" mitigation approaches described elsewhere herein, which convert all indirect branches in the form of return, the described "randpoline" techniques do not modify the nature of the affected indirect branches, and are therefore compatible with existing control flow mitigation technologies like CFG, RFG, CET and RAP. Moreover, in certain embodiments such techniques may be used in combination with "retpoline" mitigation approaches in order to provide more robust protection against side-channel based attacks.

While figures of the present disclosure illustrate and/or describe operations according to particular embodiments in accordance with techniques described herein, it is to be understood that not all such operations are necessary for other embodiments. Indeed, it is fully contemplated herein that in other embodiments of the present disclosure, the operations illustrated and/or described with respect to such figures, and/or other operations described herein, may be combined in a manner not specifically shown in any of those drawings, but still fully consistent with the present disclosure. Thus, claims directed to features and/or operations that are not exactly shown in one drawing are deemed within the scope and content of the present disclosure.

In general, devices described herein may comprise various physical and/or logical components for communicating information which may be implemented as hardware, software, or any combination thereof, as desired for a given set of design parameters or performance constraints. Although the accompanying figures and corresponding text may depict or describe a limited number of components by way of example, it will be appreciated that a greater or a fewer number of components may be employed for a given implementation.

In various embodiments, a device described herein described herein may be implemented for a PC, CE, and/or mobile platform as a system within and/or connected to a device such as personal computer (PC), set-top box (STB), television (TV) device, Internet Protocol TV (IPTV) device, media player, and/or smart phone. Other examples of such devices may include, without limitation, a workstation, terminal, server, media appliance, audio/video (A/V) receiver, digital music player, entertainment system; digital TV (DTV) device, high-definition TV (HDTV) device, direct broadcast satellite TV (DBS) device, video on-demand (VOD) device, Web TV device, digital video recorder (DVR) device, digital versatile disc (DVD) device, high-definition DVD (HD-DVD) device, Blu-ray disc (BD) device, video home system (VHS) device, digital VHS device, a digital camera, a gaming console, display device, notebook PC, a laptop computer, portable computer, handheld computer, personal digital assistant (PDA), voice over IP (VoIP) device, cellular telephone, combination cellular telephone/PDA, pager, messaging device, wireless access point (AP), wireless client device, wireless station (STA), base station (BS), subscriber station (SS), mobile subscriber center (MSC), mobile unit, and so forth.

In various embodiments, a device described and/or otherwise referenced herein may form part of a wired communications system, a wireless communications system, or a combination of both. For example, such a device may be arranged to communicate information over one or more types of wired communication links. Examples of a wired communication link, may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. Such a device also may be arranged to communicate information over one or more types of wireless communication links. Examples of a wireless communication link may include, without limitation, a radio channel, satellite channel, television channel, broadcast channel infrared channel, radio-frequency (RF) channel, Wireless Fidelity (WiFi) channel, a portion of the RF spectrum, and/or one or more licensed or license-free frequency bands. Although certain embodiments may be illustrated using a particular communications media by way of example, it may be appreciated that the principles and techniques discussed herein may be implemented using various communication media and accompanying technology.

In various embodiments, a device described herein may be arranged to operate within a network, such as a Wide Area Network (WAN), Local Area Network (LAN), Metropolitan Area Network (MAN), wireless WAN (WWAN), wireless LAN (WLAN), wireless MAN (WMAN), wireless personal area network (WPAN), Worldwide Interoperability for Microwave Access (WiMAX) network, broadband wireless access (BWA) network, the Internet, the World Wide Web, telephone network, radio network, television network, cable network, satellite network such as a direct broadcast satellite (DBS) network, Code Division Multiple Access (CDMA) network, third generation (3G) network such as Wide-band CDMA (WCDMA), fourth generation (4G) network, Time Division Multiple Access (TDMA) network, Extended-TDMA (E-TDMA) cellular radiotelephone network, Global System for Mobile Communications (GSM) network, GSM with General Packet Radio Service (GPRS) systems (GSM/GPRS) network, Synchronous Division Multiple Access (SDMA) network, Time Division Synchronous CDMA (TD-SCDMA) network, Orthogonal Frequency Division Multiplexing (OFDM) network, Orthogonal Frequency Division Multiple Access (OFDMA) network, North American Digital Cellular (NADC) cellular radiotelephone network, Narrowband Advanced Mobile Phone Service (NAMPS) network, Universal Mobile Telephone System (UMTS) network, and/or any other wired or wireless communications network configured to carry data in accordance with the described embodiments.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system," "component," or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical discs, compact disc read-only memories (CD-ROMs), compact disc rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions.

Other embodiments may be implemented as software executed by a programmable control device.

Thus, the present disclosure is directed to systems and methods for mitigating or eliminating the effectiveness of a side-channel based attack, such as one or more classes of an attack commonly known as Spectre. Novel instruction prefixes, and in certain embodiments one or more corresponding instruction prefix parameters, may be provided to enforce a serialized order of execution for particular instructions without serializing an entire instruction flow, thereby improving performance and mitigation reliability over existing solutions. In addition, improved mitigation of such attacks is provided by randomizing both the execution branch history as well as the source address of each vulnerable indirect branch, thereby eliminating the conditions required for such attacks.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for secure display of protected content.

According to example 1 there is provided a system for mitigating vulnerability to one or more side-channel based attacks. The system may comprise one or more processors. The system may further comprise a storage device coupled to the one or more processors. The storage device may include machine-readable instructions that, when executed by at least one of the one or more processors, cause the at least one processor to fetch a first instruction for execution that includes a speculative execution (SE) lock prefix, and initiate execution of the first instruction; to, after execution of the first instruction is initiated, fetch a second instruction; and to, responsive to a determination that the second instruction includes an SE prefix associated with the SE lock prefix of the first instruction, prevent speculative execution of the second instruction until execution of the first instruction is completed.

Example 2 may include the elements of example 1, wherein the machine-readable instructions further cause the at least one processor to, after execution of the first instruction is initiated, fetch a third instruction; and, responsive to a determination that the third instruction does not include a SE lock prefix and prior to the execution of the first instruction being completed, initiate speculative execution of the third instruction.

Example 3 may include the elements of any of examples 1-2, wherein the first instruction further includes an SE lock identifier associated with the SE lock prefix, and wherein determining that the third instruction includes an SE lock prefix associated with the SE lock prefix of the first instruction includes determining that the third instruction includes the SE lock identifier.

Example 4 may include the elements of any of examples 1-3, wherein to initiate the execution of the first instruction includes to set one or more lock bits associated with the SE lock prefix responsive to a determination that the first instruction includes the SE lock prefix, and wherein the machine-readable instructions further cause the at least one processor to clear the one or more lock bits responsive to execution of the first instruction being completed.

Example 5 may include the elements of example 4, wherein the first instruction further includes an SE lock identifier associated with the SE lock prefix, and wherein the one or more lock bits are further associated with the SE lock identifier.

Example 6 may include the elements of any of examples 4-5, wherein the machine-readable instructions further cause the at least one processor to initiate execution of the second instruction responsive to a determination that the one or more lock bits have been cleared.

According to example 7 there is provided a non-transitory computer-readable medium including machine-readable instructions that, when executed by one or more processors, cause the one or more processors to perform a method. The method may comprise fetching a first instruction for execution that includes a speculative execution (SE) lock prefix, and initiating execution of the first instruction. The method may further comprise, after execution of the first instruction is initiated, fetching a second instruction. The method may further comprise, responsive to determining that the second instruction includes an SE prefix associated with the SE lock prefix of the first instruction, preventing speculative execution of the second instruction until execution of the first instruction is completed.

Example 8 may include the elements of example 7, wherein the method further comprises, after initiating execution of the first instruction, fetching a third instruction; and, responsive to determining that the third instruction does not include a SE lock prefix and prior to the execution of the first instruction being completed, initiating speculative execution of the third instruction.

Example 9 may include the elements of any of examples 7-8, wherein the first instruction further includes an SE lock identifier associated with the SE lock prefix, and wherein determining that the third instruction includes an SE lock prefix associated with the SE lock prefix of the first instruction includes determining that the third instruction includes the SE lock identifier.

Example 10 may include the elements of any of examples 7-9, wherein initiating the execution of the first instruction includes setting one or more lock bits associated with the SE lock prefix responsive to determining that the first instruction includes the SE lock prefix, and wherein the method further comprises clearing the one or more lock bits responsive to execution of the first instruction being completed.

Example 11 may include the elements of example 10, wherein the first instruction further includes an SE lock identifier associated with the SE lock prefix, and wherein the one or more lock bits are further associated with the SE lock identifier.

Example 12 may include the elements of any of examples 10-11, wherein the method further comprises initiating execution of the second instruction responsive to determining that the one or more lock bits have been cleared.

According to example 13, a system is provided for mitigating vulnerability to one or more side-channel based attacks. The system may comprise one or more processors. The system may further comprise a storage device coupled to the one or more processors. The storage device may include machine-readable instructions that, when executed by at least one of the one or more processors, cause the at least one processor to identify a targeted branch instruction for execution, wherein the identified targeted branch instruction specifies a branch target address; and replace the targeted branch instruction with an instruction code sequence. The instruction code sequence may be to generate a distinct intermediate target address comprising a base address of a reserved intermediate address space and a randomized offset; and to cause execution to proceed to the generated distinct intermediate target address prior to proceeding to the specified branch target address.

Example 14 may include the elements of example 13, wherein the generated distinct intermediate target address comprises a sum of the base address of the reserved intermediate address space and the randomized offset.

Example 15 may include the elements of any of examples 13-14, wherein the reserved intermediate address space includes a plurality of identical instruction sequences.

Example 16 may include the elements of example 15, wherein each of the identical instruction sequences within the plurality comprises an intermediate branch instruction that specifies a final target address identical to the specified branch target address of the targeted branch instruction.

Example 17 may include the elements of example 16, wherein to cause the execution to proceed to the specified branch target address includes causing the execution of one intermediate branch instruction of the plurality of identical intermediate branch instructions.

Example 18 may include the elements of any of examples 13-17, wherein the reserved intermediate address space is a first reserved intermediate address space of multiple reserved intermediate address spaces, wherein the distinct intermediate target address is a first intermediate target address within the first reserved intermediate address space, and wherein the instruction code sequence may further be to generate a second intermediate target address comprising a distinct second randomized offset and a base address of a second reserved intermediate address space of the multiple reserved intermediate address spaces; and to cause execution to proceed to the generated second intermediate target address prior to proceeding to the specified branch target address.

Example 19 may include the elements of example 18, wherein the second intermediate target address comprises a sum of the distinct second randomized offset and the base address of the second reserved intermediate address space.

According to example 20, a non-transitory computer-readable medium is provided that includes machine-readable instructions that, when executed by one or more processors, cause the one or more processors to identify a targeted branch instruction for execution, wherein the identified targeted branch instruction specifies a branch target address. The machine-readable instructions may further cause the one or more processors to replace the targeted branch instruction with a modified instruction code sequence. The modified instruction code sequence may be to generate a distinct intermediate target address comprising a base address of a reserved intermediate address space and a randomized offset, and to cause execution to proceed to the generated distinct intermediate target address prior to proceeding to the specified branch target address.

Example 21 may include the elements of example 20, wherein the generated distinct intermediate target address comprises a sum of the base address of the reserved intermediate address space and the randomized offset.

Example 22 may include the elements of any of examples 20-21, wherein the reserved intermediate address space includes a plurality of identical instruction sequences.

Example 23 may include the elements of example 22, wherein each of the identical instruction sequences within the plurality comprises an intermediate branch instruction that specifies a final target address identical to the specified branch target address of the targeted branch instruction.

Example 24 may include the elements of example 23, wherein to cause the execution to proceed to the specified branch target address includes to cause the execution of one intermediate branch instruction of the plurality of identical intermediate branch instructions.

Example 25 may include the elements of any of examples 20-24, wherein the reserved intermediate address space is a first reserved intermediate address space of multiple reserved intermediate address spaces, wherein the distinct intermediate target address is a first intermediate target address within the first reserved intermediate address space, and wherein the modified instruction code sequence is further to generate a second intermediate target address comprising a distinct second randomized offset and a base address of a second reserved intermediate address space of the multiple reserved intermediate address spaces; and to cause execution to proceed to the generated second intermediate target address prior to proceeding to the specified branch target address.

According to example 26, a method is provided for mitigating vulnerability to one or more side-channel based attacks. The method may comprise fetching a first instruction for execution that includes a speculative execution (SE) lock prefix, and initiating execution of the first instruction. The method may further comprise, after execution of the first instruction is initiated, fetching a second instruction. The method may further comprise, responsive to determining that the second instruction includes an SE prefix associated with the SE lock prefix of the first instruction, preventing speculative execution of the second instruction until execution of the first instruction is completed.

Example 27 may include the elements of example 26, wherein the method further comprises, after initiating execution of the first instruction, fetching a third instruction; and, responsive to determining that the third instruction does not include a SE lock prefix and prior to the execution of the first instruction being completed, initiating speculative execution of the third instruction.

Example 28 may include the elements of any of examples 26-27, wherein the first instruction further includes an SE lock identifier associated with the SE lock prefix, and wherein determining that the third instruction includes an SE lock prefix associated with the SE lock prefix of the first instruction includes determining that the third instruction includes the SE lock identifier.

Example 29 may include the elements of any of examples 26-28, wherein initiating the execution of the first instruction includes setting one or more lock bits associated with the SE lock prefix responsive to determining that the first instruction includes the SE lock prefix, and wherein the method further comprises clearing the one or more lock bits responsive to execution of the first instruction being completed.

Example 30 may include the elements of example 29, wherein the first instruction further includes an SE lock identifier associated with the SE lock prefix, and wherein the one or more lock bits are further associated with the SE lock identifier.

Example 31 may include the elements of any of examples 29-30, wherein the method further comprises initiating execution of the second instruction responsive to determining that the one or more lock bits have been cleared.

According to example 32, a method is provided for mitigating vulnerability to one or more side-channel based attacks. The method may comprise identifying a targeted branch instruction for execution that specifies a branch target address. The method may further comprise generating a distinct intermediate target address comprising a base address of a reserved intermediate address space and a randomized offset, and causing execution to proceed to the generated distinct intermediate target address prior to proceeding to the specified branch target address.

Example 33 may include the elements of example 32, wherein the generated distinct intermediate target address comprises a sum of the base address of the reserved intermediate address space and the randomized offset.

Example 34 may include the elements of any of examples 32-33, wherein the reserved intermediate address space includes a plurality of identical instruction sequences.

Example 35 may include the elements of example 34, wherein each of the identical instruction sequences within the plurality comprises an intermediate branch instruction that specifies a final target address identical to the specified branch target address of the targeted branch instruction.

Example 36 may include the elements of example 35, wherein causing the execution to proceed to the specified branch target address includes causing the execution of one intermediate branch instruction of the plurality of identical intermediate branch instructions.

Example 37 may include the elements of any of examples 32-36, wherein the reserved intermediate address space is a first reserved intermediate address space of multiple reserved intermediate address spaces, wherein the distinct intermediate target address is a first intermediate target address within the first reserved intermediate address space, and wherein the method further includes generating a second intermediate target address comprising a distinct second randomized offset and a base address of a second reserved intermediate address space of the multiple reserved intermediate address spaces; and causing execution to proceed to the generated second intermediate target address prior to proceeding to the specified branch target address.

What is claimed:

1. A system for mitigating vulnerability to one or more side-channel based attacks, the system comprising:
   one or more processors; and
   a storage device coupled to the one or more processors, the storage device including machine-readable instructions that, when executed by at least one of the one or more processors, cause the at least one processor to:
      fetch a first instruction for execution that includes a directive and a speculative execution (SE) lock prefix, and initiate execution of the directive of the first instruction;
      after execution of the directive of the first instruction is initiated, fetch a second instruction that includes a directive and an SE prefix; and
      responsive to a determination that the SE prefix of the second instruction is associated with the SE lock prefix of the first instruction, prevent speculative execution of the directive of the second instruction until execution of the first instruction is completed.

2. The system of claim 1, wherein the machine-readable instructions further cause the at least one processor to:
   after execution of the directive of the first instruction is initiated, fetch a third instruction; and
   responsive to a determination that the third instruction does not include a SE lock prefix and prior to the execution of the first instruction being completed, initiate speculative execution of the third instruction.

3. The system of claim 2, wherein the first instruction further includes an SE lock identifier associated with the SE lock prefix, and wherein determining that the third instruction includes an SE lock prefix associated with the SE lock prefix of the first instruction includes determining that the third instruction includes the SE lock identifier.

4. The system of claim 1, wherein to initiate the execution of the directive of the first instruction includes to set one or more lock bits associated with the SE lock prefix responsive to a determination that the first instruction includes the SE lock prefix, and wherein the machine-readable instructions further cause the at least one processor to clear the one or more lock bits responsive to execution of the directive of the first instruction being completed.

5. The system of claim 4, wherein the first instruction further includes an SE lock identifier associated with the SE lock prefix, and wherein the one or more lock bits are further associated with the SE lock identifier.

6. The system of claim 4, wherein the machine-readable instructions further cause the at least one processor to initiate execution of the directive of the second instruction responsive to a determination that the one or more lock bits have been cleared.

7. A non-transitory computer-readable medium including machine-readable instructions that, when executed by one or more processors, cause the one or more processors to perform a method comprising:
   fetching a first instruction for execution that includes a directive and a speculative execution (SE) lock prefix, and initiating execution of the directive of the first instruction;
   after execution of the directive of the first instruction is initiated, fetching a second instruction that includes a directive and an SE prefix; and
   responsive to determining that the SE prefix of the second instruction is associated with the SE lock prefix of the first instruction, preventing speculative execution of the second instruction until execution of the first instruction is completed.

8. The non-transitory computer-readable medium of claim 7, wherein the method further comprises:
   after initiating execution of the directive of the first instruction, fetching a third instruction; and
   responsive to determining that the third instruction does not include a SE lock prefix and prior to the execution of the first instruction being completed, initiating speculative execution of the third instruction.

9. The non-transitory computer-readable medium of claim 8, wherein the first instruction further includes an SE lock identifier associated with the SE lock prefix, and wherein determining that the third instruction includes an SE lock prefix associated with the SE lock prefix of the first instruction includes determining that the third instruction includes the SE lock identifier.

10. The non-transitory computer-readable medium of claim 7, wherein initiating the execution of the directive of the first instruction includes setting one or more lock bits associated with the SE lock prefix responsive to determining that the first instruction includes the SE lock prefix, and wherein the method further comprises clearing the one or more lock bits responsive to execution of the directive of the first instruction being completed.

11. The non-transitory computer-readable medium of claim 10, wherein the first instruction further includes an SE lock identifier associated with the SE lock prefix, and wherein the one or more lock bits are further associated with the SE lock identifier.

12. The non-transitory computer-readable medium of claim 10, wherein the method further comprises initiating execution of the directive of the second instruction responsive to determining that the one or more lock bits have been cleared.

* * * * *